United States Patent [19]

Kern

[11] Patent Number: 4,544,600
[45] Date of Patent: Oct. 1, 1985

[54] RESIN COMPOSITIONS CONTAINING METALS SUCH AS ALUMINUM

[75] Inventor: George M. Kern, Schnecksville, Pa.

[73] Assignee: Silberline Manufacturing Company, Inc., Lansford, Pa.

[21] Appl. No.: 408,666

[22] Filed: Aug. 16, 1982

[51] Int. Cl.[4] .................. B32B 5/16; B32B 15/02; B32B 15/08
[52] U.S. Cl. ............... 428/323; 264/176 R; 427/221; 428/328; 428/407
[58] Field of Search ............ 428/407, 403, 404, 338, 428/328, 418; 427/216, 221; 264/176 R; 523/205; 524/270

[56] References Cited

U.S. PATENT DOCUMENTS

| | | | |
|---|---|---|---|
| Re. 28,506 | 8/1975 | Quaintance et al. | 428/418 X |
| 3,300,329 | 1/1967 | Orsino et al. | 427/216 |
| 3,354,115 | 11/1967 | Brandle et al. | 523/344 |
| 3,932,320 | 1/1976 | Camelon et al. | 523/205 |
| 3,932,347 | 1/1976 | Camelon et al. | 523/205 |
| 3,932,348 | 1/1976 | Camelon et al. | 523/205 |
| 3,932,349 | 1/1976 | Camelon et al. | 523/205 |
| 3,935,340 | 1/1976 | Yamaguchi et al. | 427/216 |
| 3,958,044 | 5/1976 | Yamaguchi et al. | 427/221 |
| 3,988,494 | 10/1976 | McAdow | 428/328 |
| 4,115,338 | 9/1978 | Kobayashi et al. | 523/205 |
| 4,116,924 | 9/1978 | Peabody | 524/270 |
| 4,127,422 | 11/1978 | Guzi, Jr. et al. | 524/270 X |
| 4,248,918 | 2/1981 | Hornibrook et al. | 428/328 X |

*Primary Examiner*—Thomas J. Herbert
*Attorney, Agent, or Firm*—Weiser & Stapler

[57] ABSTRACT

This invention relates to a novel metal pigment product which is comprised of metal particles, terpene phenol resin and polyethylene resin and the process for making them. The compositions and products made from them, are stable even after storage at room temperature or being subjected to a heat aging test. Films or coatings made from these products have a uniform dispersion of the metal particles.

62 Claims, No Drawings

RESIN COMPOSITIONS CONTAINING METALS SUCH AS ALUMINUM

The present invention relates generally to the field of organic and preferably inorganic pigment concentrates, and more particularly, is directed to a novel pelletized metal pigment product.

The invention also encompasses thermoplastic-metal pigmented films which are most noteworthy in that they exhibit a uniform appearance; i.e. the metal and resin on visual (or microscopic appearance) present virtually no visible blotches or agglomerations but rather a uniform metallic sheen and satin-like appearance and high reflectance. The films possess all of these properties and others discussed further below—even though they are manufactured from a metal resin concentrate which has been exposed to heat not uncommonly of at least 38° C. for relatively long periods of time. Heretofore, such films made from such mixtures of resins and metal pigments, especially such films with a metal content, did not possess this combination of advantageous properties. An unexpected aspect of the invention is that normally one skilled in the art could not tell from the appearance of the metal resin concentrate the final quality of the film made from such a concentrate. Indeed, without the benefit of the teaching of this invention, the concentrates appeared stable. However upon standing and/or exposure to heat they exhibited degradation or the film made from the concentrate showed agglomeration, degradation or a lack of that uniformity which is necessary in industrial applications. The films made from the pigments of the invention are pliable, thin (film about 1 mil to about 2 mils) and they can assume other physical forms such as coatings on various substrates, e.g. metal, plastic or others, or they may have other physical shapes than films.

The invention also relates to a process for making various metal-resin concentrates with various concentrations of metal pigments.

Other embodiments of the invention will become apparent as the invention is further described herein.

The metal particles most often used as a metallic color producing component are aluminum powders (spheroids) but more preferably aluminum flakes. In the description of this invention, aluminum flakes will be used to illustrate the invention. It should be understood, however, that this invention is applicable to and contemplates any particulate metal used in metallic color concentrates. The aluminum is merely used as an illustration and in no way is intended to be understood as a limitation hereof.

It is currently the usual practice to market aluminum flake products in the form of aluminum pigments which are suitable for application over a surface or any substrate in the form of a film or to form free standing or unsupported films. Various coloring agents as may be desirable for a particular application can be added to the aluminum pigments. One form of aluminum pigments generally comprises a mixture of aluminum flakes and a liquid coating, which coating most frequently is either a plasticizer or a mineral oil. The percentage of aluminum flakes in the pigment usually is in the quantity of approximately 30% to 80% by weight, with the remainder being the liquid coating of whatever type is employed. This material is conventionally packaged and is usually sold as a damp powder or paste.

A typical such product is a pigment made with 325 mesh grade flakes. Each flake is enveloped in a suitable coating or plasticizer to minimize the hazards of dust, contamination and fire. Examples of the most popular plasticizers and coatings are dioctyl phthalate, p-t-butylphenyl diphenyl phosphate, mineral oil and diisodecyl phthalate. They are present in the pigment in the quantity of about 20% to 70% by weight. These pigments have the consistency of a damp powder or paste. They are used in formulations to provide metallic finishes of many functions, for example, appearance, greater durability, moisture proofness, heat resistance, insulation or merely economical coverage. It is contemplated that the pigments may be incorporated into various paint finishes such as thermoset finishes and which may or may not be acrylic. These finishes are used especially as exterior automotive finishes but also any other place where a metallic finish is desired. The pigments can also be used in printing inks, plastics, exterior protective paints and, more generally, linings and coatings which act as barriers to gas or reflect light. Such aluminum pigments are available on the market as SILVEX® products, sold by Silberline Manufacturing Co., Inc., Lansford, Pa., U.S.A. They have the consistency and physical appearance of a silver colored damp powder or paste.

Such damp powders are popular and have generally proved satisfactory for use in the final application. However, the damp powders present inherent problems during the subsequent application. For example, the cleaning of equipment after use is difficult and results in the loss of materials. Also, in certain applications, the liquid coating material employed in the pigment could be a foreign material in the final product and must therefore be treated accordingly. The presently available liquid coatings also have been known to cause processing problems during the manufacture of color concentrates.

Because of the difficulties described above, it would be a desirable advance in the industry to provide aluminum flakes without a liquid coating and to eliminate the processing and cleanup problems introduced with the liquid coating. However, when prior workers in the art have attempted to remove the liquid coating, a dry aluminum powder results, which dry powders are dusty and have therefore presented a real danger of explosions during handling and use, due to the high surface area of the metal pigment, and exposure to the oxygen of air.

In those instances wherein aluminum color concentrates were formulated in a resin binder with a percentage by weight of metal, like aluminum flake pigment, which exceeded approximately 25%, such a product for reasons not fully understood exhibited limited shelf life and care had to be exercised to promptly utilize the formulated concentrate.

Aluminum flake pigment concentrates, either single pigment products or a combination of pigments, in the range of from 10% to 50% pigment by weight have long been available and concentrates with higher proportions have been disclosed but are not known to be in use. Earlier concentrates were generally made at the lower percentage range of pigment. More recently, certain inorganic pigments at 80% by weight have been produced. Generally speaking, however, single pigment concentrates usually consisted of approximately 50% by weight loading for inorganic pigments and 25% by weight loading for organic pigments. The prior art color matched concentrates usually consisted of a combination of pigments and could be expected to have loadings somewhere between about 5% and 50% by weight.

In order to reduce the explosion hazard inherent in dry aluminum flakes or powders and in other metallic powders, various mixtures of resins and metallic powder or aluminum flakes have been pelletized by prior workers in the art. In this manner, the particle size was increased so that the mixture could not become airborne, and thus create an explosion hazard. The usual technique employed for making pelletized color concentrates was to mix pigments in the range of from 5% to 50% by weight with a suitable resin. The mixture was then placed in an intensive mixing device and mixed sufficiently to break up any flake agglomerates; that is, to break up individual pigment particles which may be held together by strong electromotive bonds. If the electromotive bonds are broken when the pigment is in contact with a molten polymer, then the particles will remain separated by the plastic. Generally speaking, the better the job of breaking the pigment bonds, the more agglomerate-free will be the final pigment concentrate. After suitable heating, the melted concentrate could then be extruded as a strand and the strand was conventionally chopped into cylinders by a pelletizer to provide pellets usually of approximately ⅛ inch by ⅛ inch size.

However, prior workers in the art have encountered problems relating to the shelf life of such a product. Typically, at the place of use, the pelletized concentrate compounded from low density polyethylene and a pigment comprising mineral oil and a high percentage by weight of aluminum was further diluted with low density polyethylene to produce a mixture of between 1% and 2% aluminum flakes. In this composition, the mixture was suitable for extruding into thin films for application to a metallic surface or for other use, or for self-sustaining films. On a number of instances, it was found that the extruded thin film upon application was not of totally satisfactory quality in that the pigment appeared to have agglomerated. The aluminum flakes could not be dispersed evenly throughout the film. While the concentrate and pellets both appeared satisfactory, the film made from the pellets did not come up to the requisite standards. Thus, merely from the appearance of the concentrate and the pellets, the quality of the film could not be foretold.

More specifically this limited shelf-life exhibited itself by "degradation"; that is, the film manufactured from the concentrate exhibited agglomeration of the resins and/or metal particles, giving an uneven, non-uniform film, this even though the concentrate appeared to be satisfactory. An unsatisfactory film manufactured from the concentrate or from the pellets, when held up to a source of light allows light to come through the film with greater intensity in one place than in other places; i.e. the film was of uneven transparancy or opacity, this in contrast to a film of the invention which has virtually uniform opacity, and will allow virtually no light to come through especially when a high proportion of metal is used and the metal particles are virtually contiguous. Of course when this film is applied to a substrate, the film (or coating) of the invention will not allow the substrate to be seen. When a lower proportion of metal is used the metal particles are evenly distributed and the film will allow light to pass through in an even manner. In this case when the film is applied to a substrate the substrate will show through in an even manner. Thus, in contrast to the prior art concentrates which have limited shelf life, those of this invention have no such limitation or shortcoming.

In a search of the prior art the following U.S. patents were found: U.S. Pat. No. 2,947,646, Devaney et al., Colloidal Dispersion of Metals in Plastics; U.S. Pat. No. 3,300,329, Orsino et al., Metal-polyolefin Compositions and Process for Making Same; U.S. Pat. No. 3,354,,115, Brandle et al., Multiple Additive Dispersion in 1-Olefin Polymers; U.S. Pat. No. 3,491,056, Saunders et al., Metal-polymer Compositions; U.S. Pat. No. 3,932,320, Camelon et al., Powder Paints Containing Particulate Metal II; U.S. Pat. No. 3,932,347, Camelon et al., Powder Paints Containing Particulate Metal I; U.S. Pat. No. 3,932,348, Camelon et al, Powder Paints Having Aluminum Flakes Encapsulated in Thermosettable Material Containing Tetraalkylammonium Halides; U.S. Pat. No. 3,932,349, Camelon et al., Thermosettable Powder Paints Containing Encapsulated Aluminum Flakes II; U.S. Pat. No. 4,003,873, Rolles et al, Metal Pigmented Plastic Powder and Process; U.S. Pat. No. 4,009,146, Cork et al., Method of and Mixture for Aluminizing a Metal Surface; U.S. Pat. No. 4,015,999, Robertson et al., Pigment Compositions; U.S. Pat. No. 4,115,338, Kobayaski et al., Metallic Tone Coating Composition; U.S. Pat. No. 4,116,924, Peabody, Pigment Concentrations; U.S. Pat. No. 4,127,422, Guzi et al., Dry, Water-dispersible Pigment Compositions; U.S. Pat. No. 4,168,180, Peabody, Pigment Concentrations; U.S. Pat. No. 4,292,087, Bell, Coatings Pigmented With Non-Leafing Aluminum Flake. None of these patents discloses a product which is a metal flake in the polymer composition described herein that is easy and safe to use, has a long shelf life and more importantly is suitable for manufacturing into a film or coating which is virtually uniform (not coalescent in appearance), and is made from intermediate concentrates which are heat resistant.

It is an object of this invention therefore to provide a product which supplies the pigment in a stable condition, where agglomeration does not occur and the product has a long shelf life.

Another object of the invention is to provide a product which can supply the pigment in a safe form with minimal or no danger of explosion.

Another object of the invention is to provide a product which can supply the pigment in such a condition that is easy and clean to use without causing processing problems during the manufacture of a color concentrate.

Another object of the invention is to provide a concentrate in a stable condition, where agglomeration does not occur, the product has a long shelf life and is stable to extended periods of high temperature.

Another object of the invention is to provide for films of better quality made from these concentrates.

In attempting to determine the cause of the agglomation problem the following test was devised. It allows those skilled in the art to differentiate the products of the invention from those in the prior art. The test was further used to determine the acceptability of the compounds of the invention.

An aluminum flake pigment of high proportion by weight of aluminum was compounded with low density polyethylene resin at a ratio of 40% pigment to 60% resin to produce a concentrate in the following manner. The low density polyethylene resin was charged into a mixer at 218° C. and allowed to melt while being continuously mixed. Once the resin was melted, the aluminum flake pigment was slowly added and mixing was continued for approximately seven minutes to completely distribute the aluminum pigment in the melted resin. Small samples of the molten mixture were air cooled and then cut into small cubes.

Films were then produced from the small cubes of concentrate in the following manner A mixture of 0.2 g of the concentrate and 3.0 g of the low density polyethylene resin was placed between two heated plattens of a laboratory type hydraulic press and the plattens were heated to 177° C. At this temperature the mixture melted and was then compressed into thin films. The films were then removed from the press and quenched. The resulting films were then rolled and folded to produce a small ball and each ball was again subjected to heat and pressure and formed into a film. This step was repeated six times to assure that a good concentrate was completely distributed in the film. The process produced films of acceptable quality.

In order to simulate a long storage period, the following oven test was used as an accelerated screening shelf life test for prescreening the concentrates to determine whether they are satisfactory for furture use. It is of particular value for identifying those concentrates which in the course of this invention will give satisfactory results.

Portions of an ordinarily acceptable concentrate were heat-aged in an oven at 96° C. and sampling was initiated during specified time intervals. The aged samples were then diluted with a film grade low density polyethylene resin at 20 parts by weight to one part concentrate and films were made by previously outlined procedures. The resultant films were of poor quality and it was then found that some type of heat related problem apparently developed which resulted in flake agglomeration.

By exposing the "good" concentrate for twenty-four hours in an oven at 96° C., it was found that this would always produce a resultant film of generally poor quality. Exposure of the "good" concentrate for longer periods of time, for example 3 months, produced a concentrate that was unmeltable in the filmmaking step possibly because of crosslinking of the polymer.

Various melting agents and adhesion promoters were tried in an effort to prevent agglomeration, with little or no success. Finally, after experimenting with products formulated with the resin phase comprising combinations of polyethylene wax and terpene-phenol resin, significant improvements were achieved.

Of course, any other test which shortens the time and raises the temperature or conversely lengthens the time and lowers the temperature would be likely to bring about the same results, namely distinguishing the "good" concentrate from the "bad". For one skilled in the art it will be apparent that it is contemplated within the spirit of the invention that a product, the concentrate of which remains stable after exposure to 96° C. even for less than twenty-four hours is also considered to be within the scope of this invention.

DESCRIPTION OF THE PREFERRED EMBODIMENT OF THE INVENTION

The present invention relates generally to the field of metal resin pellets, and more particularly, is directed to a novel composition that is capable of preventing the agglomeration of metal flakes in a film formed of the composition.

In accordance with this invention there has now been discovered a composition which makes available pigment concentrates which have long shelf lives with no indication of agglomeration or other instability and produces films of better quality than previously obtained. It has been discovered in accordance with this invention that the addition of a friable dispersing resin to the pigment or pigment concentrate confers the advantageous properties discussed above. The composition comprises a free flowing granular material of particles covered with a coating formed from a friable dispersing resin or a mixture of a friable dispersing resin and a hydrocarbon resin. In one aspect of the invention mineral oil may also be present. In another aspect of the invention plasticizers such as dioctylphthalate, p-t-butylphenyl diphenyl phosphate or diisodecyl phthalate may also be present.

Particles of a wide variety of metals may be encased in accordance with the present invention. The properties of the resulting encased product will depend, of course, upon the metal particles and the use for which the encased product is intended. Among the metal particles which may be employed are those of metals of Group I-B, III-A, IV, VI-B and VIII of the Periodic Table. Also, physical mixtures or alloys of these metals may be employed. Examples of these metals include aluminum, bronze, brass, chromium, copper, gold, iron, lead, molybdenum, nickel, tin, titanium, zinc and the like.

The shape of the metal particles used in the composite material may be of any scaly fibrous, rod-like, acicular, platelet, granular and spherical structures and can suitably be selected therefrom according to the desired metallic tone appearance of the film or coating. Especially desirable are flakes which are flat and powder which is spherical. The shape of the particles used is determined by the ultimate use of the film or coating made from the product; for example use as a decorative or protective coating, automotive finish, an ink or a bag.

The friable or easily crumbled or pulverized dispersing resins employed in this invention are thermoplastic synthetic hydrocarbon polymers having a preferably ring and ball softening point of from about 70° to about 195° C., preferably from about 100° to about 180° C. and a molecular weight generally within the range of from about 350 to about 2000, preferably from about 400 to 1400. The types of hydrocarbon resins which have the above properties include the terpene phenol resins obtained by condensing various terpenes such as dipentene, pinene, limonene and various turpentine cuts with phenols, such as phenol, cresol, alkyated phenols, for example, normal butyl phenol, tertiary butyl phenyl, propyl phenol and the like, in the presence of a catalyst such as sulfuric acid, sulfonic acid, aluminum chloride, boron trifluoride or the molecular components of boron trifluoride with ethers, acids, alcohols and phenols.

The role of these terpene phenol polymers is not yet fully understood except that, in accordance with the invention the polymer-metal concentrates made therefrom and the films or coating manufactured therefrom do prevent the agglomeration of pigments and improve good dispersion and shelf life of the products made with them. They prevent the reagglomeration of pigments, especially metal flakes, in thermoplastic resin systems. A resin is said to be thermoplastic as is known in the art when it can be made to soften and take on new shapes by the application of heat and pressure.

The hydrocarbon resins of this invention include but are not limited to the polyethylenes, polypropylenes, polystyrenes, acrylics and the like. Of course the invention contemplates that the hydrocarbon resin be also halo substituted (such as chloro or fluoro groups). Such halogenated hydrocarbons are well known to one skilled in the art. The preferred hydrocarbon resins of this invention are polyethylenes which may be of high or low density. The polyethylene polymers employed in this invention are preferably low density polyethylene polymers having a ring and ball softening point from about 70° to about 155° C., preferably from about 90° to about 135° C. and a molecular weight from about 1,500 to about 24,000, preferably from about 2,000 to 15,000. Preferred are the water insoluable polymers.

Typical resins of these types are the terpene-phenol resins commercially available as the Nirez Resins of Reichhold Chemicals, Inc. and the Piccolyte Resins of Hercules Incorporated and the polyethylene resins commercially available as Epolene Waxes of Eastman Chemical Products, Inc.

It has been discoverd in accordance with this invention that when there is above a certain concentration of metal flakes in a resinous composition, but for the presence of terpene phenol resin, the composition tends to be inadequately stable and is not satisfactory enough for making concentrates suitabe for making uniform film and coatings. Although this may differ from composition to composition and especially with the nature of the resin content, the concentration of the metal where the instability starts being apparent is about at 15% by weight of the composition but more often at 20% or higher.

The proportion of terpene phenol resin in the total composition of the pigment should preferably be at least about 6% by weight. It has also been found in accordance with the invention that amounts less than about 6% by weight are also advantageous to confer the desired properties. The smallest proportion of terpene phenol resin present is that which will show and confer to the concentrate a control of the aggomeration and better quality film as discussed below. In that connection amounts as low as 0.5 to 1.5% by weight have been found to show such properties. Also amounts of about 2.5% of terpene phenol resin show beneficial results. Accordingly, it is within the contemplation of the invention that there be amounts of terpene phenol resin present which are less than 6% by weight but this does not seem to be as desirable as amounts in excess of 6% by weight. For economical, and not technical reasons, there does not seem to be a reason for exceeding certain ranges of terpene phenol resin. Accordingly, most preferred is an upper range of about 40% by weight of terpene phenol resin in the pigment.

When the resin phase of the pigment is 100% terpene phenol resin, the product presents the problems of dustiness and therefore should be combined with known plactizers, polyethylene resins and/or mineral oil. It is preferred that 5% to 80% of the non-metallic phase is terpene phenol resin.

In one aspect of this invention the pigment is comprised of terpene phenol resin, mineral oil and of greater than about 20% by weight of metal flakes, of various other lubricants such as stearic acid or other fatty acids, plasticizers such as dioctyl phthalate or antioxidants such as butylated hydroxy toluene may be present. In accordance with the invention the proportion of terpene phenol resin in the total composition of the pigment should preferably be at least about 6% by weight although it has also been found that amounts less than about 6% by weight are also advantageous. Amounts as low as 0.5% to 1.5% by weight and also of about 2.5% by weight of terpene phenol resin also show beneficial results. Accordingly it is within the contemplation of the invention that there be amounts of terpene phenol resin present which are less than 6% by weight but this does not seem as desirable as amounts in excess of 6% by weight.

In another aspect of the invention there is a special pigment which has particular interest under certain circumstances. Such a pigment is identifiable in that it is virtually free of mineral oil (but not necessarily free of the other additives including lubricants, plasticizers and antioxidants as described above). Such composition, free of mineral oil, may preferably contain a mixture of metal flakes, terpene phenol resin and a polyethylene resin as described above. The composition of the pigment may contain amounts of terpene phenol resin from the smallest amount which will show beneficial results in imparting greater resistance to the agglomeration of the concentrate (as disclosed above); that is, an amount of at least about 0.5% by weight. The upper range of the amount of terpene phenol is about 80% by weight of resin phase as discussed above. The preferred proportion of terpene phenol resin to the total composition of the pigment is from about 5% to about 40% by weight.

In a preferred embodiment of this invention the powder of the pigment comprising metal flake, terpene phenol resin and polyethylene resin is compressed and formed into pellets. The size of the pellets is large enough that the particles are not easily airborne thereby minimizing the danger of explosion.

In another aspect of the invention the above mentioned pigments are diluted with polyethylene polymer to yield pigment concentrates, the composition of which comprises metal particles, terpene phenol resin, polyethylene resin and may comprise also mineral oil depending on the composition of the pigment which is diluted. In this aspect of the invention the proportion of metal flakes in the concentrate should be at least about 20% by weight. Preferably the range is from about 20% to 50% by weight but the proportion may be higher up to about 80% by weight depending on the proportion of metal flakes in the pigment which is being diluted. The proportion of terpene phenol resin in the total composition of the concentrate should preferably be at least 2% by weight. It has also been found that amounts less than about 2% by weight are also advantageous to confer the desired properties. The smallest proportion of terpene phenol found to be effective is from about 0.2% to 0.6% by weight. For the reasons stated above the most preferred upper range is about 40% by weight.

In another aspect of the invention the terpene phenol resin is added to the polyethylene at the same time the pigment is added. In this case the pigment need not contain the terpene phenol resin. Instead, the terpene phenol resin is added as the concentrate is prepared. The preferred range is from about 2% to 5% by weight but it may be as low as about 0.2% or as high as about 40% by weight as is discussed above.

In a preferred embodiment of the invention the metal component is aluminum flakes.

In another preferred embodiment, the metal component is aluminum powder.

In another preferred embodiment, the composition of the pigment comprises at least 70% aluminum by weight.

In another preferred embodiment, the composition of the pigment comprises about 80% aluminum by weight.

In another preferred embodiment, the composition of the pigment comprises about 80% aluminum flakes by weight, about 6% terpene phenol resin by weight and about 14% polyethylene resin by weight.

In another preferred embodiment, the composition of the pigment comprises about 80% aluminum flakes in weight, about 4% terpene phenol resin by weight and about 16% polyethylene resin by weight.

In another preferred embodiment the composition of the concentrate comprises about 2.5% of terpene phenol resin, about 32% aluminum flakes and about 65.5% polyethylene resin by weight.

In another preferred embodiment, any of the preferred compositions are compressed into pellets.

TABLE 1

| Sample Number | % Aluminum Flakes | % Polyethylene | % Terpene Phenol | % Mineral Oil |
|---|---|---|---|---|
| 1 | 80 | 14 | 6 | — |
| 2 | 79 | 14.7 | 6.3 | — |
| 3 | 78.4 | 13.7 | 5.9 | 2 |
| 4 | 80 | 10 | 10 | — |
| 5 | 78 | 10 | 10 | 2 |
| 6 | 70 | 21 | 9 | — |
| 7 | 32 | 57.5 | 2.5 | 8.0 |
| 8 | 79 | — | 6.3 | 14.7 |
| 9 | 79 | — | 5.0 | 16.0 |
| 10 | 31.6 | 65.9 | 2.5 | — |
| 11 | 79 | — | 0.5 | 20.5 |

It is also contemplated within the scope of this invention that the concentration of the metal content (e.g. flakes) in the composition may be less than 80% by weight. It may be as low as 10% or even 1–2% by weight. At these lower concentrations of metal, it is by far preferred that a terpene phenol type resin and a polyethylene type resin be concurrently present. The metal is preferably selected from the group of aluminum, brass, bronze, copper, iron, lead, nickel, tin, zinc, and gold or an alloy thereof.

In order to more fully disclose the nature of the present invention, the following general procedure and examples illustrating the invention are disclosed. It should be understood, however, that this is done solely by way of example and is intended neither to delineate the scope of the invention nor limit the ambit of the appended claims.

Aluminum pigment comprising aluminum flakes and a processing lubricant such as stearic or oleic acid is mixed with a solvent such as mineral spirits and two resins. Sufficient solvent is added to dampen the mixture typically 20% to 30% based on metal content. Sufficient modified polyethylene wax is added so that it constitutes 70 percent of the resin phase. The balance of the resin (30 percent) consists of terpene phenol resin. A wetting agent of the type well-known to those skilled in the art may be added in an amount of up to about 5%. The preferred wetting agents include the anionic, cationic and non-ionic surfactants.

The mixture is heated to above the melting point of the resins (about 130° C.) and in so doing the solvent is lost through evaporation. During the heating cycle a portion of the resin mixture is dissolved in the solvent so that as the solvent is evaporated some of the resin mixture is deposited on the aluminum flakes.

When all of the solvent has been removed, the mixture is cooled to room temperature. A small amount of mineral oil (2% or less) or other suitable material may be added at this point to reduce the possibility of a dust cloud forming during subsequent handling of the material. The cooled material can be further processed through a pellet mill. The mixture may not go through a melt stage but be compressed by the mill into pellets which have a nominal dimension of ⅛-inch by 3/16-inch.

Pellets of varying compositions are made by the same method. In this way there are produced, for example, pellets with the concentrations shown in Table 1.

The pellets which are produced are easy to handle. The fine particles have been removed or densified so that the aluminum flakes do not become airborne. The pellets are preferred over dry powders which are dangerous to use or damp powders which present difficulties in the clean-up of equipment after use. The advantages of the invention are illustrated by the following tests.

In order to obviate the undesirable effects of heat aging and to protect the resin employed from thermal degradation during processing, an aluminum pigment concentrate was compounded by employing an aluminum pigment comprising 80% by weight aluminum flakes of 325 mesh grade and 20% by weight of mineral oil. This pigment was mixed with lightly stabilized low density polyethylene resin in a porportion of 40% pigment and 60% polyethylene resin. This produced a concentrate which contained 32% by weight of aluminum flakes. To this mixture 0.1% butylated hydroxyl toluene was added as an antioxidant in an effort to protect the resin from thermal degradation. After subjecting the formulation to the heat-aging test and then dilution as above set forth, it was found that after twenty-four hours of heat exposure, the resultant display film failed inasmuch as it contained undesirable agglomerations of aluminum flake particles.

In another test, a similar concentrate was made from a commercially available, fully stabilized low density polyethylene resin. Again internal stabilization was employed to prevent degradation when aluminum was present. This sample also failed, after twenty-four hours of heat exposure, to produce an acceptable film.

Another commercially acceptable sample concentrate was prepared using 80% by weight 325 mesh grade aluminum flakes with 20% dioctyl phthalate as the wetting plasticizer instead of mineral oil. The concentrate was mixed with 60% by weight of low density polyethylene resin as above and again subjected to heat aging. This sample, when diluted and made into a film, also failed and produced agglomerated aluminum flakes.

Another sample was prepared by starting with larger mesh aluminum flakes mixed with mineral oil as the wetting plasticizer. It failed when heat aged, diluted and made into a film as above.

In another test, the low density polyethylene resin used in the compounding of the concentrate was heat-aged for twenty-four hours prior to compounding. After compounding, the concentrate was diluted and let down according to the above film test and no degradation was noted. However, upon exposing the concentrate to the heat-aging test, the film produced from the compound again failed and proved to be commercially unacceptable.

In another test, an aluminum pigment comprising 80% 325 mesh grade aluminum flakes and 20% by weight mineral oil was heat-aged prior to compounding. After compounding with low density polyethylene resin, the concentrate was diluted and let down according to the usual film test and no degradation was noted. However, when the concentrate was subjected to the heat-aging test, the same unacceptable thin film result was noticed. The test was varied by employing mineral spirits in place of the mineral oil. The same unacceptable thin film results were noted.

Another series of tests was initiated wherein the aluminum flake pigment was modified in various respects. The resulting prepared formulations showed various levels of improvement in the resistance to the heat-aging test in that there was little or no agglomeration noted in the films made from the concentrates until the concentrates were heated for longer than twenty four hours; i.e. up to forty eight hours or even as long as one hundred twenty hours.

An aluminum pigment containing 80% by weight 325 mesh grade aluminum flakes with 20% by weight mineral oil was compounded with low density polyethylene resin to yield a concentrate containing 20% pigment and 80% low density polyethylene resin. This more dilute concentrate was subjected to the heat-aging test. After dilution improvement in the resultant film was noted but after longer heat aging as mentioned above unacceptable results were obtained.

A 32% metal concentrate was prepared utilizing a larger, non-leafing, aluminum flake as compared to the 325 mesh grade flake above noted and subjected to the heat aging test. After this concentrate was diluted about 2% aluminum by weight with low density polyethylene resin a slight improvement in the film was noted but after longer heat aging as mentioned above, unacceptable results were obtained.

Another 32% metal concentrate was made by employing a smaller non-leafing aluminum flake than the 325 mesh grade aluminum flake set forth above. Heat aging and then dilution with low density polyethylene resin to about 2% aluminum by weight also resulted in a slight improvement in the film until heat-aged for longer than twenty four hours as described above. Then unacceptable results were obtained.

A 32% metal concentrate was prepared utilizing a leafing type aluminum flake smaller than the 325 mesh grade aluminum flake above set forth. This concentrate was heat aged and then diluted with low density polyethylene resin to about 2% by weight of aluminum. The resultant film showed a slight improvement until heat aged for longer than twenty four hours. Then unacceptable results were noted.

Next, a commercially available concentrate containing approximately 10% by weight aluminum flakes was heat aged and then mixed with 80% by weight low density polyethylene resin. A marked improvement in the test film resulted which was attributed to the low percentage by weight of aluminum flakes in the pigment. However the disadvantages; i.e., cost, ease of handling, and storage of a pigment of such low metal content render it less acceptable than high percentage metal content for large scale commercial use.

In an effort to saturate the resin with a stearic acid, a concentrate was prepared from a pigment of 80% by weight aluminum flakes and 20% by weight mineral oil. To this concentrate of 32% by weight of aluminum, 8% by weight of mineral oil and 55% by weight of low density polyethylene there was added 5% by weight stearic acid. After heat-aging for one hundred and twenty hours, the resulting thin film showed rather complete agglomeration. It was found that any attempt to add additional stearic acid to the concentrate was impractical due to formulation difficulties in the preparation of the concentrate.

A concentrate was then prepared from a pigment which contained approximately 79% by weight aluminum flakes of 325 mesh grade, 14.7% by weight low density polyethylene and 6.3% by weight terpene phenol resin. After heat-aging and dilution with low density polyethylene resin a great improvement was noted in the film.

Next, in an effort to determine the effect of terpene phenol resin as above set forth, a sample containing 32% by weight of 325 mesh grade aluminum flakes, 8% by weight mineral oil, 56.4% low density polyethylene resin and 3.6% terpene phenol resin was prepared. This sample was heat-aged according to the procedure outlined above and after a year of oven-aging, dilution of the concentrate with low density polyethylene resin to a concentration of about 2% by weight of aluminum and subsequent treatment according to the film test produced a film with no agglomeration.

In order to determine the concentration effects of the terpene phenol resin, the following series of tests were formulated:

| Test Number | % Aluminum Flakes | % Mineral Oil | % terpene phenol |
|---|---|---|---|
| 1 | 80 | 18.75 | 1.25 |
| 2 | 80 | 17.50 | 2.50 |
| 3 | 80 | 15.0 | 5.00 |
| 4 | 80 | 13.70 | 6.30 |

The concentrates of test numbers 1, 2, 3, and 4 were then compounded with 60% by weight low density polyethylene resin. These concentrates were then heat-aged according to the test procedure outlined above and the following table shows the actual percent of terpene phenol resin in the concentrate and the failure point in the heat-aging test.

| Sample Test Used | % terpene phenol | Failure Point |
|---|---|---|
| 1 | 0.5% | 16 days |
| 2 | 1.0% | 60 days |
| 3 | 2.0% | 225 days (estimated) |
| 4 | 2.5% | No failure after 350 days |

Based on the above tests, it is thought that the lubricant on the pigment, such as stearic acid or oleic acid, is being absorbed, thereby leaving the aluminum flakes unprotected. The absorption of the lubricant appears to be accelerated at elevated temperatures, thereby leaving the unprotected flakes, due to their very close proximity in a 40% concentrate, to tend to weld together or even perhaps to start to cross link the polyethylene. It is also thought that in a 10% concentrate, the flakes are separated by more resin and do not tend to form agglomerates by whatever mechanism this phenomenon may take place. However the 10% concentrate is not economical for the reasons stated above.

It is further thought that with the addition of the terpene phenol resin to the formulation, either the lubricant is sealed around the aluminum flakes, or if it is still being absorbed, it is replaced by a polymeric coating, which coating may be either terpene phenol or terpene phenol-low density polyethylene.

While applicants have not limited their invention to any particular theory, it seems apparent that the polymer such as the terpene phenol resin does provide some unknown qualities to the aluminum particle which unexpectedly then increases the shelf life of the final aluminum concentrate.

Accordingly, by adding a percentage of terpene phenol resin to the formulation prior to pelletizing, an acceptable aluminum pellet product can be uniformly produced that can resist the effects of heat aging and result in a fully acceptable film for application over a metallic or other surface or use as a free standing or unsupported film.

The metal pigments, concentrates and films of the invention are ideally suited for making films or coatings; for instance, they may be used in decorative finishes for automobiles and other consumer products in protective paints, coatings, inks, plastics, bags and similar goods, in reflective gear and in gas barriers as well as in other products known to those skilled in the art. The compounds of this invention allow the products to be made with no concern about the stability or consistency of composition of the pigments and concentrates used in the process.

The unusual aspect of the invention is that the inadequacy or the shortcomings of the prior art compositions were not evident until the need arose for having resinous compositions containing a higher than usual proportion of metal content and when furthermore these resinous compositions were cast into a film made from the compositions, which films gave a mottled uneven effect rather than being uniform and smooth showing a uniform distribution of the metal. The invention therefore provides a remedy to a problem which is not immediately apparent from the physical or chemical analysis of the resinous composition but only upon comparatively long term storage at room temperature (or when exposed to an accelerated test which approximates these long term practical storage conditions) and films are cast or substrates coated with such a composition which has been stored under practical conditions for a certain time as is called for in industrial applications.

I claim:

1. A substrate having a coating, said coating comprising metal particles and mixture of resins, said metal particles being coated with said resins and being in a proportion of at least about 0.5% by weight and said resin comprising a terpene phenol resin having a softening point range from about 70° to 195° C. and a low density polyethylene resin having a softening point range of 90° to 135° C. and a molecular weight range from about 2,000 to 15,000, said coated metal particles prior to forming said coating on said substrate being flowable and non-self adhesive,
said coating being of virtually uniform metal distribution, exhibiting a uniform metallic sheen, satin-like appearance and high reflectance with no visible blotches or agglomeration.

2. The article of claim 1 wherein the metal is aluminum and the terpene phenol resin has a molecular weight range from about 400 to 1,400.

3. The article of claim 1 wherein the coating on said substrate is formed by melting the resins onto said substrate.

4. A substrate having a coating, said coating being formed of a coating composition comprising coated metal particles of
(a) at least about 15% by weight of metal particles selected from the group consisting of aluminum, brass, bronze, copper, iron, lead, nickel, tin, zinc, gold and alloys thereof,
(b) a low density polyethylene resin having a molecular weight range from about 2,000 to 15,000, and
(c) a stabilizing agent which is a terpene phenol resin having a molecular weight range from about 400 to about 1,400,
said polyethylene resin and said terpene phenol resin forming a coating on said particle surfaces, said coated metal particles prior to forming said coating on said substrate being flowable and non-self adhesive.

5. The article of claim 4 wherein said substrate is a metal.

6. The article of claim 4 wherein said metal particles are aluminum flakes.

7. A flowable non-self-adhesive composition which comprises metal particles which are coated with a coating wherein
(1) the metal is selected from the group of aluminum, brass, bronze, copper, iron, lead, nickel, tin, zinc and gold or an alloy thereof, and
(2) the coating comprises a mixture of (a) a terpene phenol resin and (b) at least one member of the group consisting of a plasticizer and mineral oil,
said metal being present to a percentage by weight where but for the presence of the terpene phenol resin, the concentrate made from said composition is not stable,
said terpene phenol resin being present in an amount of at least about 0.5% by weight,
said composition being especially suited for making uniform concentrates for use in films and coatings, said concentrates having improved shelf life.

8. The composition of claim 7 including an agglomeration of coated metal particles.

9. The composition of claim 7 including discrete metal particles being coated.

10. The composition of claim 7 wherein said composition is a free flowing powdery composition of substantially agglomerate free dispersion of discrete coated particles.

11. The composition of claim 7 wherein the terpene phenol resin is in a range from about 0.5% to about 6% by weight.

12. The composition of claim 7 wherein mineral oil and a plasticizer are both present.

13. The composition of claim 7 wherein mineral oil is present and the composition is free of plasticizer.

14. The composition of claim 7 wherein a plasticizer is present and the composition is free of mineral oil.

15. The composition of claim 7 which includes polyethylene resin.

16. The composition of claim 7 wherein the terpene phenol resin is present in the range from about 0.5% to 1.5% by weight.

17. The composition which is a concentrate of claim 7 which includes polyethylene resin.

18. The composition of claim 7 wherein there is from 0.5% to 1.5% by weight of terpene phenol resin.

19. The composition of claim 7 wherein there is at least about 5% by weight of terpene phenol resin.

20. The composition of any one of claims 7, 18, 19 which is capable of withstanding heat of about 96° C. for more than 24 hours without degradation.

21. The composition of claim 20 wherein the metal is aluminum.

22. The composition of claim 21 wherein the metal is aluminum flakes and the terpene phenol resin has a softening point range from about 100° C. to 180° C. and a molecular weight range from about 400 to about 1400.

23. The composition of claim 22 wherein there is about 80% by weight of aluminum, about 5 to 7% by weight of terpene phenol resin and about 13 to 15% by weight of mineral oil.

24. The composition of claim 23 wherein a synthetic plasticizer is also present.

25. A composition which is a concentrate of claim 7 which comprises an additional amount of low density polyethylene resin so as to dilute the prior concentration of aluminum and terpene phenol resin.

26. The composition of claim 25 wherein there is from about 20 to 80% by weight of aluminum, about 0.1 to 25% by weight of terpene phenol and from about 20 to 80% by weight of low density polyethylene resin.

27. The composition of claim 25 wherein there is from about 30 to 35% by weight of aluminum, about 2 to 5% by weight of terpene phenol resin and from about 60 to 68% by weight of low density polyethylene resin.

28. The composition 25 wherein there is about 32% by weight of aluminum, about 2.5% by weight of terpene phenol resin and about 65.5% by weight of low density polyethylene resin.

29. A composition which comprises the products according to claim 7 to which low density polyethylene resin has been added, so as to dilute the prior concentration of aluminum, terpene phenol resin and mineral oil.

30. The composition of claim 29 wherein there is from about 20 to 60% by weight of aluminum, about 2 to 5% by weight of terpene phenol resin, from about 2 to 7% by weight of mineral oil and from about 25 to 75% by weight of low density polyethylene resin.

31. A pelletizable resinous pigment composition comprising flowable non-self adhesive coated metal particles of
(a) at least about 15% by weight of metal particles selected from the group consisting of aluminum, brass, bronze, copper, iron, lead, nickel, tin, zinc, gold and alloys thereof,
(b) a low density polyethylene resin having a molecular weight range from about 2,000 to 15,000, and
(c) a stabilizing agent which is a terpene phenol resin having a molecular weight range from about 400 to about 1,400,
said polyethylene resin and said terpene phenol resin forming a coating on said particle surfaces.

32. The composition of any one of claims 7 or 31 including a lubricant selected from the group consisting of stearic acid and oleic acid.

33. The resinous composition of claim 31 which is capable of withstanding heat of about 96° C. for more than 24 hours without degradation.

34. The composition of claim 31 wherein the proportion of polyethylene resin is larger relative to the amount of terpene phenol resin.

35. The composition of claim 31 wherein there are substantially equal proportions of polyethylene resin and terpene phenol resin.

36. The composition of claim 31 wherein there is from about 60 to about 80% by weight of aluminum.

37. The composition of claim 31 wherein there is about 80% by weight of aluminum.

38. The composition of claim 31 wherein there is greater than 80% by weight of aluminum.

39. The composition of claim 31 wherein a wetting agent is also present.

40. The composition of claim 31 wherein a plasticizer is also present.

41. The composition of claim 31 wherein the composition is in the physical shape of compressed pellets.

42. The composition of claim 31 wherein said terpene phenol resin and said polyethylene resin form the sole resin coating on said particles.

43. The composition of claim 31 wherein at least one of said resins is melted onto said particles.

44. The composition of claim 31 wherein said terpene phenol resin and said polyethylene resin encapsulate only metal particles.

45. The composition of claim 31 wherein said metal particles are aluminum flakes or alloys thereof.

46. The composition of claim 31 which is substantially free of agglomeration.

47. The composition of claim 31 wherein said composition is powdery and free flowing.

48. The composition of claim 31 wherein the proportion of polyethylene resin is smaller relative to the amount of terpene phenol resin.

49. The composition of claim 31 wherein the metal is aluminum.

50. The composition of claim 49 wherein the aluminum is finely divided.

51. The composition of claim 50 wherein the aluminum is aluminum flakes or aluminum powder.

52. The composition of claim 31 wherein the proportion of polyethylene resin to terpene phenol is in a range of about 7 to 8 to a range of about 3 to 2.

53. The composition of claim 52 wherein the polyethylene to terpene phenol resin is in the relative ratio of about 7 to 3.

54. The composition of claim 53 wherein there is about 80% by weight of aluminum.

55. The composition of claim 31 wherein a wetting agent and plasticizer are also present.

56. The composition of claim 55 wherein an antioxidant for the resin is present.

57. The composition of claim 31 wherein there is about 80% by weight of aluminum, about 5 to 7% by weight of terpene phenol resin and about 13 to 15% by weight of polyethylene resin.

58. The composition of claim 7 wherein the aluminum is aluminum powder.

59. The composition of claim 57 which are free flowing pellets.

60. The composition of claim 31 wherein the metal particles are present in an amount of at least about 20% by weight of composition.

61. The composition of claim 60 wherein the metal particles are present in the range of 20% to 80% by weight of composition.

62. The composition of claim 61 wherein the metal is aluminum.

* * * * *